United States Patent [19]

Gaussin

[11] 4,220,349

[45] Sep. 2, 1980

[54] TRAILER VEHICLE

[76] Inventor: Henri Gaussin, Hericourt, France

[21] Appl. No.: 934,865

[22] Filed: Aug. 18, 1978

[30] Foreign Application Priority Data

Oct. 24, 1977 [FR] France .............................. 77 31885

[51] Int. Cl.² .......................................... B62D 13/02
[52] U.S. Cl. .................................. 280/116; 267/36 R
[58] Field of Search .............. 280/116, 426, 442, 443, 280/98, 99, 114, 115, 121; 267/36 R

[56] References Cited

U.S. PATENT DOCUMENTS

| | | | |
|---|---|---|---|
| 1,668,079 | 5/1928 | Irwin | 280/116 |
| 2,237,056 | 4/1941 | Manning | 267/36 R |
| 2,413,212 | 12/1946 | Brown | 280/116 X |
| 2,838,323 | 6/1958 | Coustillac | 280/116 |
| 2,918,302 | 12/1959 | Hartenstine | 280/433 X |
| 4,121,853 | 10/1978 | McKay | 280/433 |

Primary Examiner—John A. Pekar
Attorney, Agent, or Firm—O'Brien & Marks

[57] ABSTRACT

The vehicle, such as a trailer, is of the type comprising a platform assembled with a chassis provided with coupling means. The platform-chassis assembly is carried by at least one set of wheels provided with springs. The chassis is angularly movable relative to the platform. The platform is connected to the chassis by a self-lubricating pivotal assembly comprising at least one wear plate interposed between the platform and the chassis. The wear plate is connected to rotate with one of the relatively pivotable parts, namely the platform or the chassis, and is pivotally mounted on a pivot which interconnects the relatively pivotable parts.

7 Claims, 7 Drawing Figures

TRAILER VEHICLE

BACKGROUND OF THE INVENTION

The invention relates to a vehicle on wheels such as a towed trailer formed by a platform and a chassis capable of pivoting with respect to each other.

A good number of vehicles are known which have one or more sets of wheels at least one of which is mounted on a pivotal assembly so as to be angularly movable relative to the chassis and thereby impart a large steering circle to the vehicle.

In this kind of construction, the pivotal assembly is most often formed by large rings in the form of half shells respectively fixed to the chassis of the vehicle and to the pivotable set of wheels, a rolling rotation being ensured by a circulation of balls.

This type of pivotal mounting is not very advantageous, since frequent greasing will be required in order to avoid premature wear of the balls which are subjected to high loads and stresses.

SUMMARY OF THE INVENTION

The invention concerns a pivotal assembly for a vehicle which is simple to manufacture and requires practically no maintenance and in particular no greasing.

Further, this assembly is thin, so that when it is combined with a special manner of hooking the springs to the chassis, a lower vehicle structure is obtained.

According to the invention there is provided a vehicle, such as a trailer, of the type comprising a platform assembled with a chassis provided with coupling means, the platform-chassis assembly being carried by at least one set of wheels provided with spring means, the chassis being angularly movable relative to the platform, wherein the platform is connected to the chassis by a self-lubricating pivotal assembly comprising at least one wear plate which is interposed between the platform and the chassis is connected to rotate with one of the relatively pivotable parts, namely the platform or the chassis, and pivotally mounted on a pivot which interconnects the two relatively pivotable parts.

According to a feature of the invention, the pivotal assembly comprises two metal plates respectively rigid with the platform and the chassis, the wear plate being interposed between these two metal plates with which it is assembled by the pivot which extends through the three plates.

According to another feature, the pivot consists of an end member, formed by a portion of a cylindrical bar provided at one end with a blind radial orifice and at its other end with a flange for fixing it to the chassis, a bronze bushing through which the end member extends and two sleeves in at least one of which sleeves the bronze bushing is disposed, said pivot interconnecting the two metal plates and the wear plate and being immobilized axially by a washer provided with a radial orifice which is capable of being placed in alignment with the orifice of the end member for receiving a stop pin.

BRIEF DESCRIPTION OF THE DRAWINGS

A vehicle according to the invention is shown by way of a non-limitative example in the accompanying drawings in which.

DESCRIPTION OF THE PREFERRED EMBODIMENTS OF THE INVENTION

Figure 1:
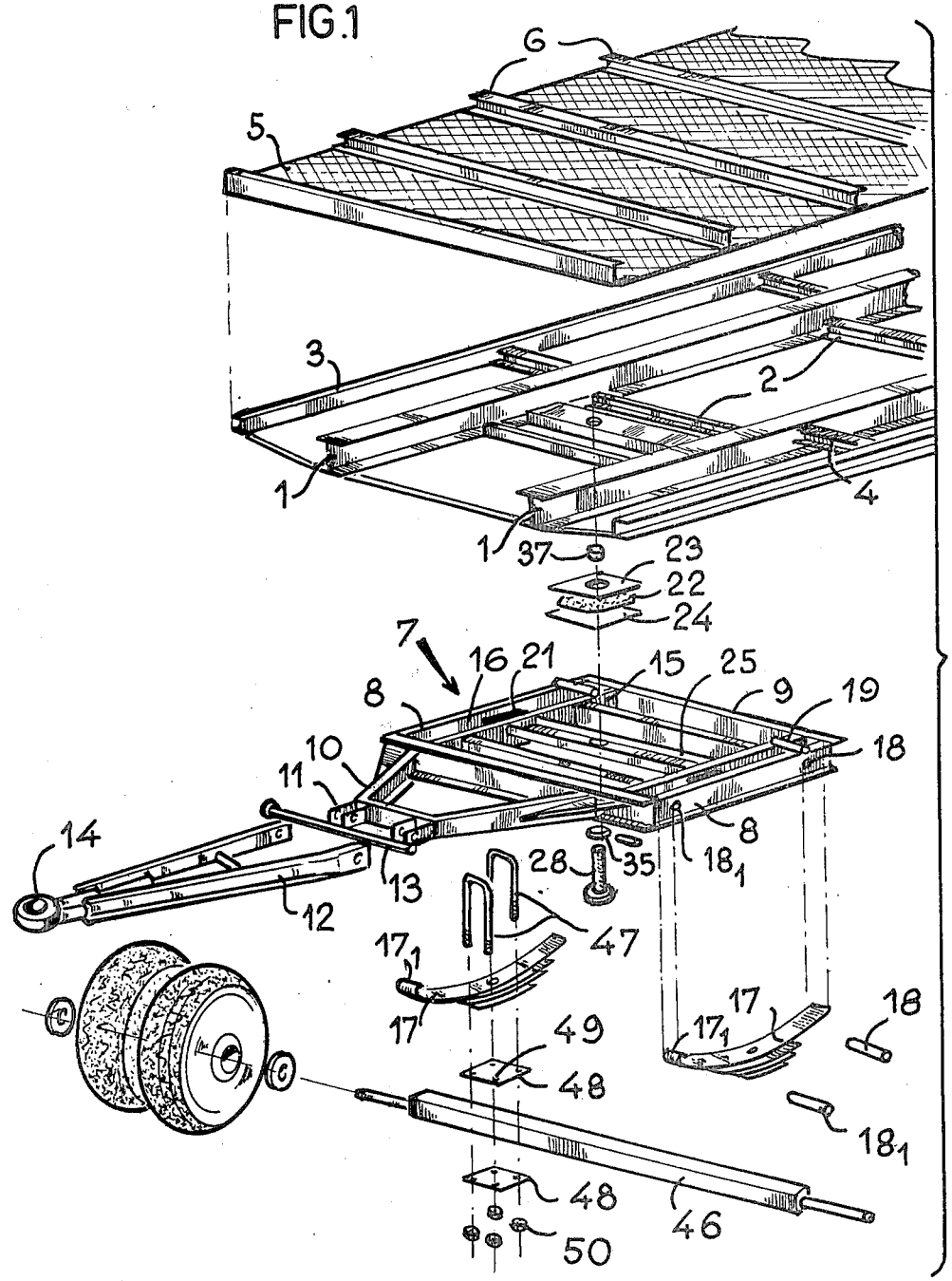
FIG. 1 is an exploded perspective view of a trailer according to the invention.
Figure 2:
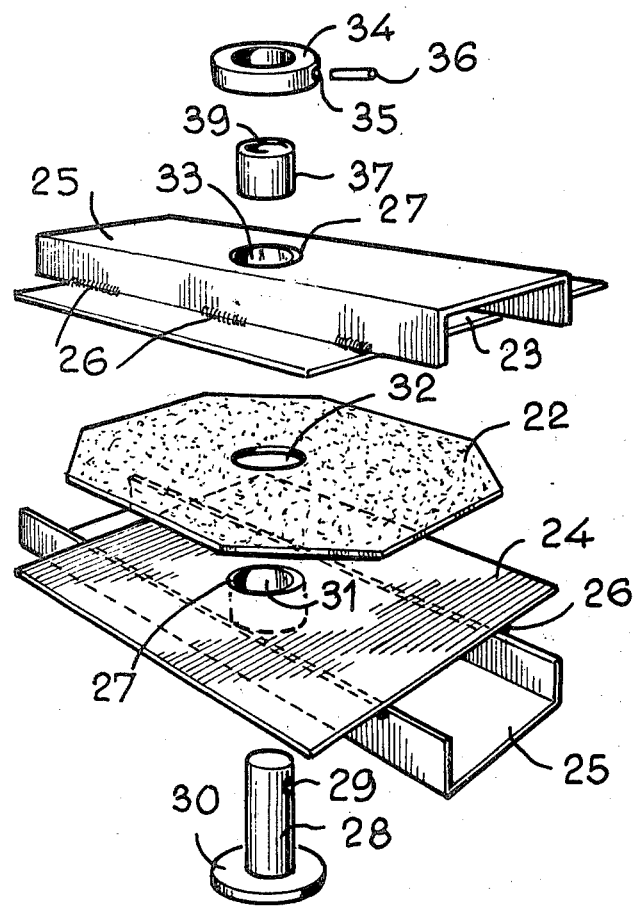
FIG. 2 is an exploded perspective view of the pivotal assembly.

The vehicle according to the invention is, in the preferred embodiment illustrated in FIGS. 1 to 7, a trailer which is capable of being coupled to a tractor vehicle, the trailer being formed by three main parts, namely a platform, a chassis carrying the front part of this platform and including coupling means and a pivotal assembly such as that illustrated in FIG. 2.

As shown in FIG. 1, the platform comprises mainly two longitudinal members 1 interconnected by a series of welded cross-members 2. This structure is extended laterally by two other section members 3 connected to the longitudinal members 1 by welded struts 4. This undeformable metal frame is covered with a flooring 5 of sheet metal to which transverse members 6 are welded to permit the passage of the fork of a pallet lifting device.

This platform is assembled with a chassis 7 (FIGS. 1 and 4) comprising two main longitudinal members 8 which are interconnected by transverse members 9 on one of which are welded two arms 10 provided with tabs 11 for the pivotal mounting of coupling bars 12 by means of a coupling pin 13, the two coupling bars being interconnected by a ring 14 for coupling to the tractor vehicle. This chassis comprises, in addition to the two main longitudinal members, two auxiliary longitudinal members 15 (FIG. 4) which are parallel to the main longitudinal members but spaced from the latter so as to define cavities 16 in which the leaf-type springs or suspensions 17 can be disposed, the width of the springs being substantially less than the width of the cavities 16.

Fixed between the main longitudinal members 8 and the auxiliary longitudinal members 15 are two pins 18 and $18_1$ for the hooking of the springs. Hooked on the pin $18_1$ is the end hooked-shaped portion $17_1$ of the upper leaf of the spring, the other pin 18 being provided for the slidable mounting of the other end portion $17_2$ of this leaf.

Figures 4, 5:
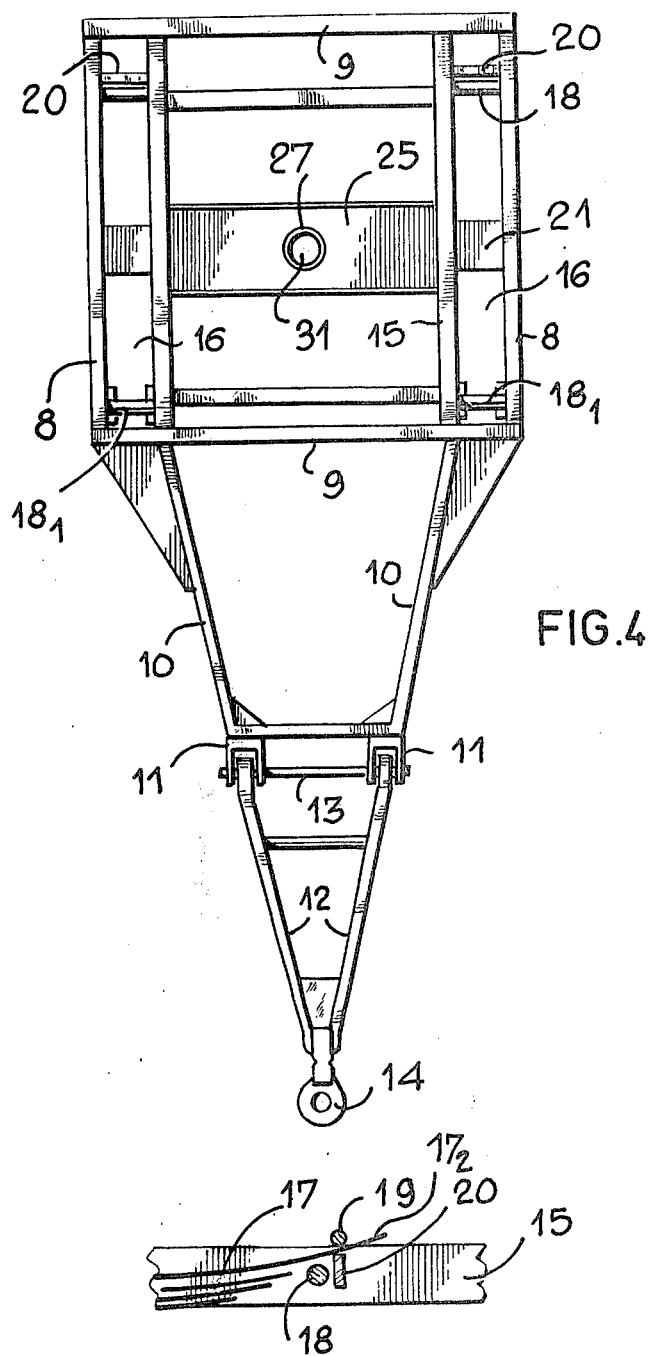
FIG. 4 is a top plan view of the chassis of the trailer.
FIG. 5 is a sectional view of a detail of the sliding part of a leaf type spring.
Figure 6:
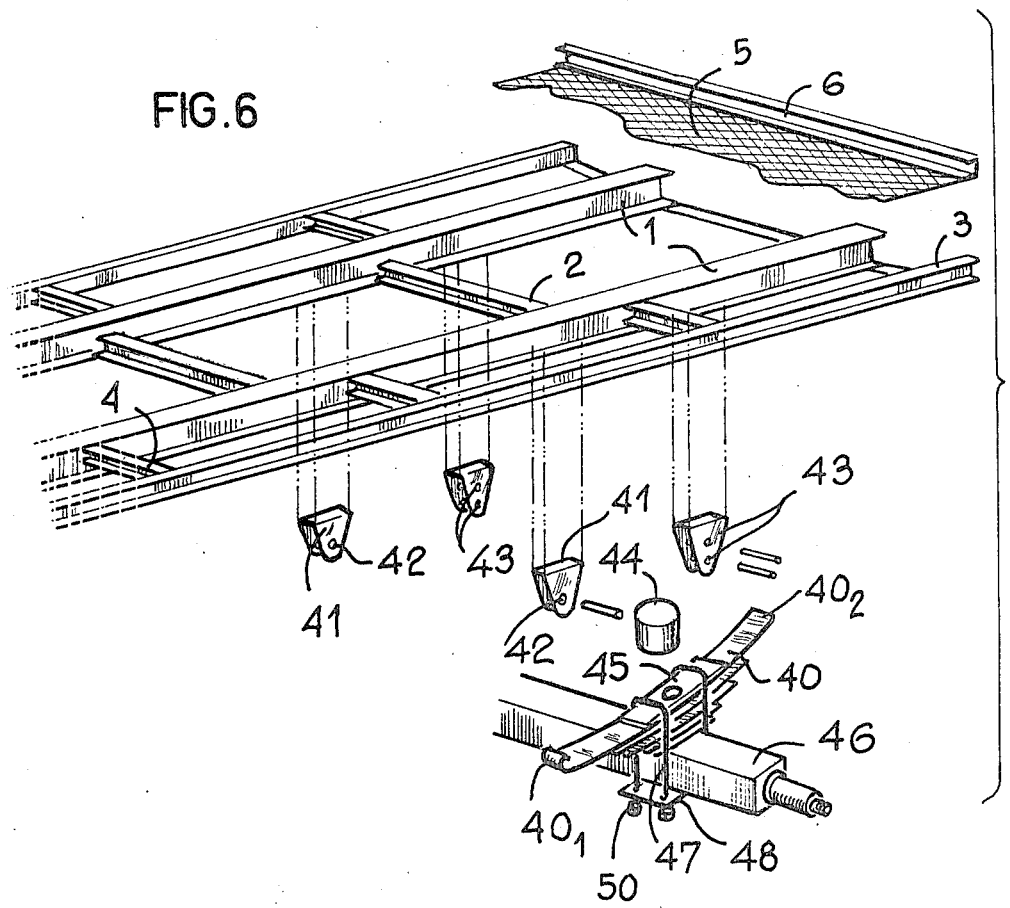
FIG. 6 is an exploded perspective view of the mounting of the rear spring.
Figure 7:
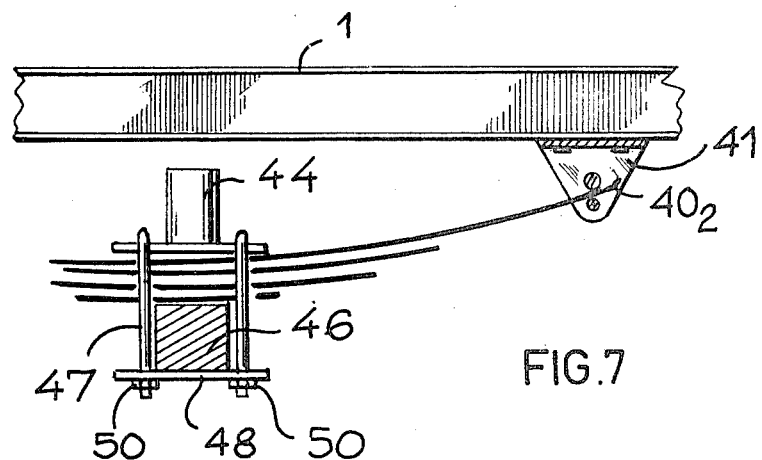
FIG. 7 is a cross-sectional view of the rear axle.

As shown in FIG. 5, a rod portion 19 is welded to the upper face of the two main and auxiliary longitudinal members of the same pair of longitudinal members as is clear from FIG. 1. This rod is offset in the vertical and horizontal plane of the pin 18 and cooperates with a strip 20 welded between the two main and auxiliary longitudinal members, the end portion $17_2$ of the upper leaf of the spring being engaged between the strip 20 and the rod 19 to be freely slidable between these two welded members.

Welded between the two longitudinal members of the same pair is an abutment 21 (FIGS. 1 and 4) with which the spring comes in contact when the loading of the vehicle exceeds the allowable load. The special mounting of the springs, which is fully housed within the thickness of the chassis, is adapted to avoid losing the benefit of the reduction in thickness achieved by the pivotal assembly illustrated in FIG. 2.

Figure 3:
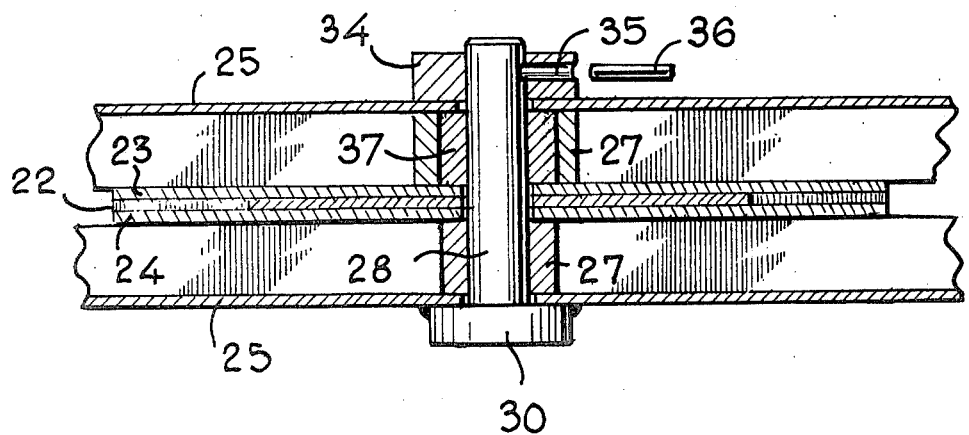
FIG. 3 is a sectional view of this pivotal assembly.

This pivotal assembly comprises an antifriction and self-lubricating wear plate which is stratified or moulded, and inserted between two metal plates 23 and 24 which are respectively rigid with the platform and the chassis. This wear plate is of polyolefine. It is rigid and resists shocks, wear and abrasion. Each of the two metal plates is reinforced and supported by a stiffening section member 25 which is welded to the plates at 26, each assembly of the plate and stiffening section member receiving a metal sleeve 27 which is provided to act as a bearing for the pivot on which the pivotal assembly will be pivotally mounted. The stiffening members 25 have a U-shaped cross section and are welded at opposite ends to the respective longitudinal members 1 and 15. This pivot comprises an end member 28 formed by a portion of a cylindrical bar which is provided at one end with a blind radial orifice 29 and at its opposite end with a projecting flange 30 for fixing this pivot under the stiffening section member 25 of the plate 24, as illustrated in FIG. 3.

This pivot is consequently engaged from below in the orifice 31 formed in the metal plate 24 and in the stiffening section member 25 and is disposed in the sleeve 27 positioned in the orifice 31. This pivot is then engaged in the orifice 32 formed in the centre of the wear plate 22 and extends into the ring 27 disposed in the orifice 33 extending through the metal plate 23 and the stiffening section member 25. The projecting portion of the end member 28, that is to say which projects above the section member 25, receives a locking washer 34 provided with a radial orifice 35 which is capable of being brought into alignment with the blind orifice 29 for the purpose of engaging a pin 36 therein as shown in FIG. 3. This washer thus axially immobilizes the pivot 30.

For the purpose of avoiding a premature wear of the pivot 28, a bronze bushing 37 having an outside diameter corresponding to the bore 38 of the sleeve 27, is interposed between the sleeve and the pivot 28, the outside diameter of the latter corresponding to the bore 39 of the bronze bushing. This arrangement is clearly illustrated in FIG. 3.

This assembly thus allows a relative angular movement between the chassis and the platform, the pivotal assembly being extremely flat since the sole thickness remaining between the longitudinal members 1 of the platform and the longitudinal members 8 and 15 of the chassis result from the simple sandwich structure formed by the wear plate 22 and the metal plates 23 and 24 since the stiffening section members 25 of the two metal plates are themselves housed, as can be seen in FIG. 1, within the thickness of the longitudinal members 1 or 15. Now the inserted position of the springs 17 between the pair of longitudinal members 8 and 15 of the chassis precisely has for purpose to avoid losing the benefit of this advantage, which enables the platform to be placed as low as possible to facilitate the loading and unloading thereof.

In the considered embodiment, and although this is not limitative, the platform comprises a set of rear wheels which is fixed in the same way as the set of the wheels of the chassis except that the hooking of the upper leaf 40 of the spring is achieved by bracket members 41 welded under the longitudinal members 1 of the platform. One of the fork members comprises a pin 42 on which the hookshaped end portion $40_1$ of the spring is hooked, whereas the other end portion $40_2$ is slidably mounted between the two pins 43 of the opposite fork member.

In the same way as the chassis, the platform comprises an abutment 44 which is welded to a plate 45 disposed on the upper leaf 40 of the spring, this abutment encountering the longitudinal members 1 in the event of overloading.

In both cases, whether it concerns the set of wheels of the chassis or the set of wheels of the platform, the springs are fixed to the wheel shaft 46 by stirrups 47 and plates 48 which are placed on each side of the wheel shaft. The plates 48 of the set of wheels of the chassis have four orifices 49 in which the four end portions of the stirrups 47 extend, the assembly being held fast by nuts 50 which are screwed on the end portions of the stirrups.

In the case of the set of wheels of the platform, the stirrups 47 are placed astride the plate 45 and the spring and extend through the lower plate 48 and are held fast by nuts 50.

The vehicle design just described provides a strong trailer since it is well-built and is positioned low down owing to the thinness of the pivotal mechanism and the special housing of the shock-absorbers of the chassis. Further, the use of a pivotal assembly comprising merely a wear plate 22 interposed between the two moving parts (trailer and chassis) is reliable in operation and easy to service, since the wear plate is self-lubricating and requires merely a single greasing in the factory upon assembly.

It must be understood that this design may be applied to any vehicle other than trailers, and to one or more sets of wheels which may be merely supporting wheels or steering wheels, without departing from the gist of the invention as recited in the claims.

I claim:

1. A vehicle such as a trailer, comprising
a chassis provided with coupling means;
a platform;
a pivotal assembly pivotally connecting the platform to the chassis to form a platform-chassis assembly;
at least one set of wheels combined with spring means carrying said platform-chassis assembly;
said chassis being angularly movable relative to the platform;
said pivotal assembly being self-lubricating and including two metal plates rigidly mounted on the platform and the chassis, respectively, a wear plate which is interposed between the two metal plates, said two metal plates and said wear plate each having an orifice, and a pivot extending through the orifices of the three plates and pivotally interconnecting the platform and the chassis,
said platform and said chassis each including a U-section stiffening member on which the respective metal plate is fixedly mounted, and
each stiffening member extending across the respective metal plate and provided with an orifice in axial alignment with the orifices formed in the metal plates for receiving the pivot.

2. A vehicle as claimed in claim 1, wherein the wear plate is of polyolefine, is rigid and resists shocks and abrasion.

3. A vehicle as claimed in claim 1, wherein said pivot has an end member formed from a portion of a cylindrical bar and provided at one of its ends with a first radial orifice and at its opposite end with a flange for fixing it to the chassis, a bronze bushing through which the end member extends and two sleeves in at least one of which sleeves the bronze bushing is disposed, the pivot interconnecting the metal plates and the wear plate, a washer provided with a radial orifice which is capable of being put into alignment with the orifice of the end member, and a stop pin received in said second radial orifice and said first radial orifice for axially immobilizing the pin.

4. A vehicle as claimed in claim 1, wherein the chassis and the platform each comprise longitudinal members and the metal plates are fixed to the platform and the chassis by their respective stiffening U-section members which are disposed between and welded to the longitudinal members thereof.

5. A vehicle such as a trailer, comprising
a chassis provided with coupling means;
a platform;
a pivotal assembly pivotally connecting the platform to the chassis to form a platform-chassis assembly;
at least one set of wheels combined with spring means carrying said platform-chassis assembly;
said chassis being angularly movable relative to the platform;
said pivotal assembly being self-lubricating and including at least one wear plate which is interposed between the platform and the chassis, and a pivot interconnecting the chassis and the platform, said wear plate being pivotally mounted on the pivot;
said spring means being a pair of leaf springs
the chassis including two pairs of spaced apart and parallel longitudinal members, the longitudinal members of each pair being spaced apart from each other for receiving the respective leaf spring therebetween, and two pins interconnecting the longitudinal members of each pair and engaging the respective leaf springs to support the chassis on the leaf springs.

6. A vehicle as claimed in claim 5, wherein one end portion of each leaf spring is hooked to one of the two pins interconnecting each pair of longitudinal members, the opposite end portion of each leaf spring being freely mounted for sliding against the respective second pin, and there is included a third pin welded to the two longitudinal members of each pair, the third pins being offset relative to said second pins such that the free end portions of the leaf springs are retained between the second and third pins.

7. A vehicle as claimed in claim 5, wherein a stop member is fixed between the longitudinal members of each pair, said stop member being located substantially in the median plane of the length of the pair of longitudinal members.

* * * * *